United States Patent [19]

Gottlieb

[11] Patent Number: 4,785,194
[45] Date of Patent: Nov. 15, 1988

[54] MULTIPLE SWITCH CONTROL SYSTEM

[75] Inventor: Morton S. Gottlieb, Rockville, Md.

[73] Assignee: Izumi Corporation Industries, Inc., Patchogue, N.Y.

[21] Appl. No.: 25,190

[22] Filed: Mar. 12, 1987

Related U.S. Application Data

[63] Continuation-in-part of Ser. No. 847,272, Apr. 2, 1986, Pat. No. 4,737,656.

[51] Int. Cl.$^4$ .............................................. H02J 1/00
[52] U.S. Cl. .................................. 307/10 R; 307/112; 340/52 R
[58] Field of Search ......................... 307/9, 10 R, 115; 74/552, 558, 484 R, 484 H, 473 SW; 364/424; 340/22, 572, 573, 51, 52 R, 52; 200/61.54, 61.55, 61.56, 61.57, 56 R, 61.35

[56] References Cited

U.S. PATENT DOCUMENTS

| | | | |
|---|---|---|---|
| 4,028,620 | 6/1977 | Kitagawa et al. | 307/10 R X |
| 4,055,733 | 10/1977 | Holsinger et al. | 324/99 D X |
| 4,306,218 | 12/1981 | Leconte et al. | 307/10 LS |
| 4,340,824 | 7/1982 | Shaw | 307/10 R X |
| 4,386,279 | 5/1983 | Yoshimi et al. | 307/10 R |
| 4,430,576 | 2/1984 | Fowler | 307/39 X |
| 4,438,425 | 3/1984 | Tsuchida et al. | 307/10 R X |
| 4,442,515 | 4/1984 | Meitzler | 307/10 R X |
| 4,453,088 | 6/1984 | Moore | 307/10 R |
| 4,456,903 | 6/1984 | Kishi et al. | 307/10 R X |
| 4,471,230 | 9/1984 | Yamamoto | 307/10 R |
| 4,532,432 | 7/1985 | Mizuno et al. | 307/10 R |
| 4,578,592 | 3/1986 | Nakazawa et al. | 307/10 R |

Primary Examiner—William M. Shoop, Jr.
Assistant Examiner—Paul Ip
Attorney, Agent, or Firm—Stephen E. Feldman

[57] ABSTRACT

A plurality of control switches are located in the hub of a steering wheel of a vehicle. The switches are connected to a remote control distribution terminal by a single lead connector. Actuation of each switch creates a switching voltage identifiable with that switch by a control circuit in the remote control distribution network. Reference voltages of predetermined values are applied selectively to individual control circuits in a circuit network. A control circuit in the network identifies the actuation of its associated switch by comparing the value of the switch created voltage with a predetermined threshold voltage or reference and the effect of the switch created voltage value on the adjacent control circuit. Switch components are actuated for control of selected vehicle accessories.

4 Claims, 7 Drawing Sheets

MULTIPLE SWITCH CONTROL SYSTEM

BACKGROUND OF THE INVENTION

This application is a continuation-in-part of co-pending patent application Ser. No. 847,272, filed Apr. 2, 1986, now U.S. Pat. No. 4,737,656.

The present invention relates to remote control systems and in particular multiple switch control systems for control of accessory equipment and/or apparatus in a motor vehicle such as radio, telephone, cruise control, television and turn signals, for example in which the controls for the various accessories are centrally located, for driver convenience but remote from the accessory.

In the past, motor vehicles, such as passenger automobiles and trucks, for example, were designed with the controls for various accessory equipment such as radio, head lights, and windshield wipers, for example, located on the dash board or in a console close to the driver of the vehicle so that the controls of the accessory equipment were easily accessible to the driver. The location of these controls were not always driver convenient because what was convenient to one person may be inconvenient to another person because of the wide range of the size of people driving motor vehicles. Also, often the concept of eye appeal took preference over driver convenience and accessability where location of controls of accessory equipment was concerned.

When turn signals were added as motor vehicle accessory equipment, the controls for these signals were generally located on the steering column, very close to and conveniently accessable to the driver, along with the shift control for the automatic transmission of the vehicle.

Subsequently, other controls such as head light control windshield wiper and washer controls, horn and cruise control were also located on the steering column, along with the steering wheel tilt control. The placement of these several controls on the steering column made these controls more readily accessable to the driver but this attempt at centralization of these many controls became confusing to the driver. In order to reduce the confusion these controls were combined, as much as deemed practical, and were separated or spred out around the steering column where ever practical. This took so much space on the steering column that placement of additional controls on the steering column is seen as not practical from a space stand point and only adding to driver confusion, from the multiplicity of controls standpoint.

Current thought for the design and placement of additional controls for other accessories of a motor vehicle or for removal of some accessory controls from the steeing column is to place additional controls for other accessories closer to the driver and in an area where the driver can view the controls more readily without removing his eyes from the road or with minimal eye removal from the road while the vehicle is in operation. The hub or central area of the steering wheel has been considered a desirable area in which to place additional controls. Placement of controls for accessory equipment in the hub area or central area of the steering wheel will place these controls closer to the driver and in a more convenient area of view for the driver than previously located, but where controls located on the steering column are in a stationary location, controls located in the hub area or central area of the steering wheel would rotate with the steering wheel when the steering wheel is turned while steering the vehicle. The use of a wire harness containing a plurality of wires or control lines loosely positioned about the steering wheel shaft, to permit rotation of the steering wheel presents the danger of binding the steering shaft.

SUMMARY OF THE INVENTION

The present invention overcomes the problem incurred in the use of a multiple wire, wire or control harness when locating a plurality of control switches in the hub area of a steering wheel by using a single wire or single line control for a plurality of switches. The single line control system permits the use of a plurality of switches positioned in the steering wheel hub area, which rotates with the steering wheel when the vehicle is being steered by the driver. A single lead or control line connects the plurality of switches with a control distribution terminal remotely located from the steering wheel hub. The single control line is loosely gathered about the steering wheel shaft so as to permit turning the steering wheel, and therfore the steering wheel shaft, without the danger of binding the steering shaft by the control line. The single control line extends from the control switches in the hub of the steering wheel, down the steering shaft and to the control distribution terminal which maybe located on the fire wall of the vehicle or at some other remote location under or behind the dash board of the vehicle.

OBJECTS OF THE INVENTION

It is an object of the invention to provide a multiple switch, multi-control control system for a motor vehicle in which a plurality of switches are located in the hub of the steering wheel of the vehicle and the control distribution terminal is located remote of the switches and a single line collectively connects the switches and the control distribution terminal, with the single line connector between the switches and the distribution terminal loosely following part of the steering wheel steering shaft.

Another object is to provide a multiple switch, multi-control control system for controlling accessory equipment in a motor vehicle in which the driver actuatable switches are located in the hub of the steering wheel and the control distribution terminal is located remote from the driver actuatable switches with a single lead control line connecting the drivers actuatable switches and the control distribution terminal, the single lead control line extending along and loosely about the steering shaft of the motor vehicle.

BRIEF DESCRIPTION OF THE DRAWINGS

The objects above and other objects will become apparent when reading the description of invention with reference to the drawings in which.

DETAILED DESCRIPTION OF THE PREFERRED EMBODIMENT

Figure 1:
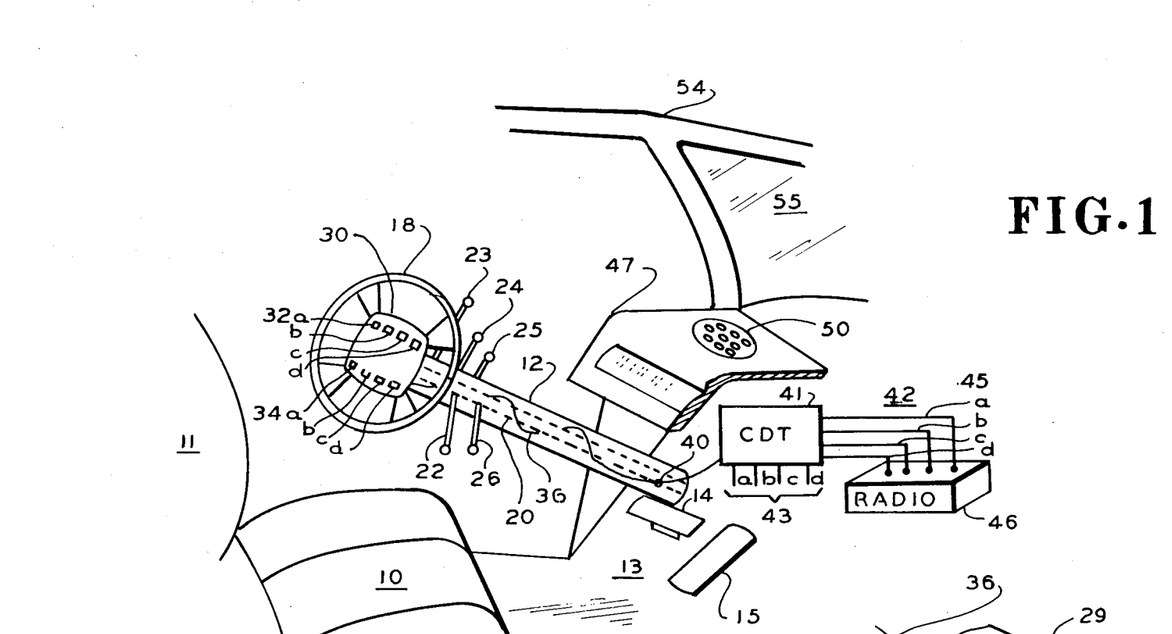
FIG. 1 is a pictorial representation of part of the interior of a motor vehicle representing one use of the present invention.

FIG. 1 represents pictorially, that section of a motor vehicle occupied by the driver when operating the vehicle. The seat 10 and seat back 11 are represented in part with the steering column 12 extending out of the floor section 13. A brake pedal 14 and an accelerator pedal 15 are represented spaced on the floor. At the top of the steering column 12 is a steering wheel 18. The steering wheel is connected to a steering shaft 20, (shown in broken line form) by a threaded shaft and nut combination, not illustrated. The steering column 12 is shown as a fixed cover over the steering shaft 20. The shaft rotates as the steering wheel 18 is turned but the steering column or cover remains stationary or fixed. There is, as indicated a space between the steering wheel shaft and the steering column or cover. In the area between the steering column or cover 12 and the steering shaft 18 some controls and control leads or cables are located. These controls are represented as the lever 22, for the transmission control, lever 23 for the turn signal control and head light control, lever 24 for the windshield wiper and washer control, lever 25 for the steering wheel tilt control and lever 26 for the horn control. As will be appreciated, these various levers for the various accessory controls take a great deal of space both around the steering column and, since the levers are connected to the accessory equipment with which it is associated take a reasonable amount of space in the area between the inside of the steering column 12 and the steering wheel shaft 20.

Although the drawing is merely representative of controls on a steering column, one can see that driver confusion could easily develop because of the multiplicity of levers or controls in the same area and especially since the control levers are under the steering wheel.

In the hub 30 of the steering wheel 18 there are represented two groups of four buttons. The group of buttons 32a, b, c, and d represent four switches that may, for example control the radio. The group of buttons 43a, b, c and d represent four switches that may control the cruise control for the engine. Each switch of the eight switch is located in the hub 30 of the steering wheel 18 is connected to the single lead 36 which lead is loosely wound around the steering shaft 20 and exits out an opening 40 in the steering column 12. The lead 36 extends to the control distribution terminal CDT 41, secured to the fire wall 42. The circuit of the control distribution terminal is shown in more detail in FIG. 2. Control lines 45a, b, c and d are illustrated as extending from the terminal 41 to the radio 46. It will be seen that a dash board 47 (shown in part) covers the fire wall area where the terminal 41 and the radio 46 are secured. In the dash board 47 a radio speaker 50 is represented.

It will be obvious to one who drives a motor vehicle that the switches 32a, b, c and d and 34a, b, c and d are both accessable and convenient to the driver when the driver is behind the steering wheel and operating the vehicle. The windshield 55 and some frame structure 54 are also represented.

It should be understood that the specific placement of the switches or buttons 32a, b, c and d and 34a, b, c and d in the hub 30 of the wheel 18 is a matter of choice and design. The specific size and design of the hub 30 is also a matter of choice. Although eight switches or buttons are illustrated fewer than eight or more than eight may be used, if desired. The buttons or switches used may be any type of 12 volt electric switch appropriate for such use, such as snap switches or pressure sensative switches, without limitation. The accessory equipment controlled by the set of switches may be a radio, as illustrated or a cruise control, as represented by the control lines 43.

If desired, other buttons or switches may be added and selectively located in the hub 30 for controlling a television receiver located in the vehicle or buttons or switches used for dialing a telephone may be located on the hub of the steering wheel.

Certainly the buttons and/or switches are within easy view of the driver and the buttons, may be identified as to their function by a panel designed for such identification.

Figure 1A:
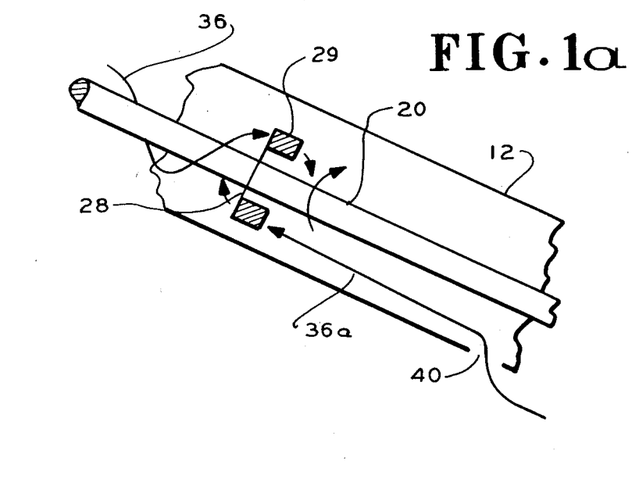
FIG. 1a is a representation of an alternate rotatable electric connection usable in practicing the invention.

FIG. 1a shows an electrical connection which avoids a long loosely wound line around a rotating shaft by providing a conductive disc and at least one electrical brush riding on the conductive disc and one brush coupled to and riding with the disc as the disc rotates with the steering shaft. The disc part 28 is nonconductive and is coupled or fixed to the steering shaft 20 so that the disc 28/29 rotates with the shaft. The disc part 29 is conductive and is attached to disc part 28. The lead 36 extending from the switches or buttons 32 and 34 makes contact with the disc part 29, on its upper surface. The lead 36 may be fixed to the disc part 29 or ride on the disc part 29, as desired, however, electrical contact is made between the two conductors. The lead 36a is preferably a fixed position lead and makes riding or sliding contact on the lower surface of disc part 29. The lead 36a extends out of the steering column or cover 12 via opening 40.

The structure represented in FIG. 1a is an alternate structure that may be used in place of the single, continous lead structure such as that represented in FIG. 1.

Figure 2:
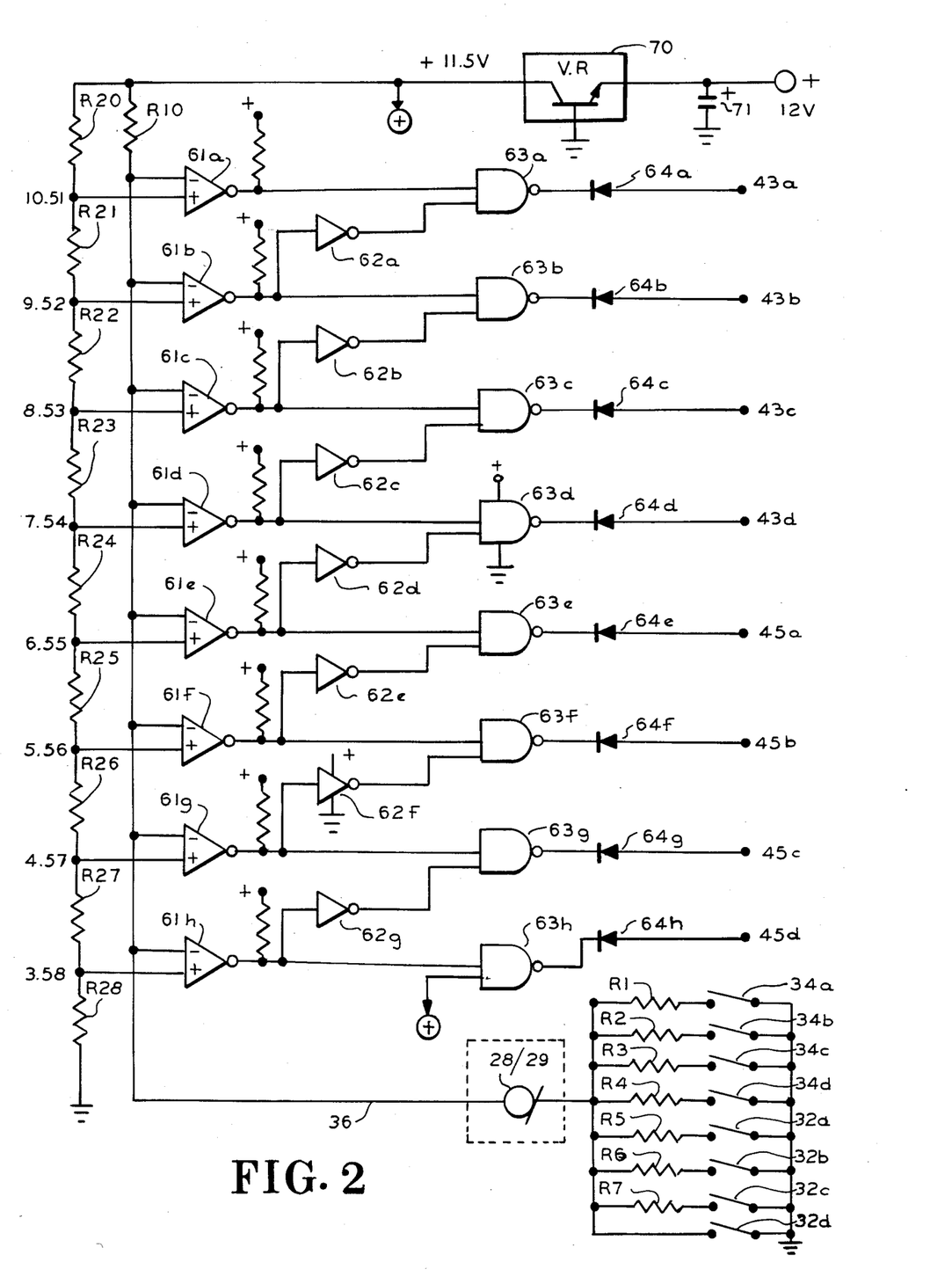
FIG. 2 is a circuit diagram of an eight switch, single line logic switch control system.

Referring to FIG. 2. a circuit diagram of the multiple switch single lead control system is represented in which the switches 32a, b, c and d and 34a, b, c and d are represented in the lower right corner of the drawing. The alternate structure for a moving or rotary connection as shown in FIG. 1a is represented and may be used in the system as represented by the broken line box around the call out 28/29. The lead 36 represents the correspondingly identified lead in FIG. 1.

In general, each switch (34a, b, c and d and 32a, b, c and d) has associated there with a resistance (R1 through R7) of progressively increasing resistance value. When any one switch is closed the voltage applied along lead 36 and therefore to each of the voltage sensative logic circuits, is a function of the value of the input voltage (a regulated 11.50 volts) and the value of the resistance (R1 through R7) placed in the circuit below the resistance R10. The serially connected resistance elements effectively form a voltage or potential divider.

Each control circuit is associated with a particular switch by virture of the voltage values to which the control circuit is sensative. Each control circuit includes a comparator (61a through 61h) and a NAND gate (63a through 63h). Each comparator has applied there to a reference voltage, the value of which is individually selected for the position of the control circuit in the network.

When the value of the reference voltage exceeds the value of the switch applied voltages the output of the comparator component is logic 1. When the value of the reference voltage is less than the value of the switch line voltage the output of the comparator component is logic 0 (low).

When a logic 0 and a logic 1 are applied to the NAND gate the output of the NAND gate is logic 1 which corresponds to "OFF", for the purpose of controlling any apparatus by the control circuit represented in FIG. 1, for example, when the output of the NAND gate is logic 0, this output corresponds to "ON" for such purposes.

In the perferred embodiment a plus 12 volt supply is fed to a voltage regulator, VR which provides a regulated output of +11.50 volts. This +11.50 volts is applied to the reference voltage line to ground and to the switching level line to the switches to ground. The reference voltage level line includes spaced resistors R20 through R27 of substantially equal resistance value so that the reference voltage applied to the control circuits in the network will be sequentially reduced in value. The resistance R28 is of a higher resistance value than the individual resistors R20 through R27 in order to hold the reference voltages at the desired respective levels.

With the resistors R20 through R27 at 1000 ohms (1k) value and resistor R28 at 3600 ohms (3.6k) value and an input voltage of +11.5 volts, the reference voltage at points between successive resistors R20 through R27 as applied to the control circuits of the network will be progressively reduced in value as the control circuits appear in the network. The values of the reference voltages as applied to the comparators of the control circuits in the network remain substantially stable.

The switching voltage level line receives the +11.50 voltage input through a resistor R10 and is thence coupled to the second input of each comparator, each comparator having a reference voltage input and a switching voltage input. Each comparator 61a through 61h is such that when the switching voltage applied to the switching input exceeds the reference voltage applied to the reference voltage input, the output of the comparator is logic 0 (low). When the voltage levels are reversed, ie the reference voltage level exceeds the level of the switching voltage the output of the comparator is logic 1 (high).

The switches 32a, b, c and d and 34a, b, c and d correspond to the switches that are located in the hub 30 of the steering wheel 18 in FIG. 1. When one of these switches 32a, b, c or d or 34a, b, c or d is closed, the closed switch completes a circuit to ground which includes into the switching voltage circuit a resistance which has the effect of changing the voltage level of the switching voltage that is applied to each of the comparators in the network. The value of resistance of the switching resistors R1 through R7 are so selected that when a switch 32a, b, c or d or 34a, b, c or d is closed, the switching voltage applied to the switching voltage terminals of the comparators will have a value which is lower than at least one reference voltage value applied to the network of comparators.

The value of the input voltage and the resistance value of the resistor R10 are considered. The value of the resistor R1 is then selected so that when switch 34a is closed the value of the switching voltage applied to the comparators will be less than the value of the reference voltage applied to comparator 61a but more than the value of the reference voltages applied to the comparators 61b through 61h. The value of resistor R2 is selected so that when switch 34b is closed to put resistor R2 in the switching voltage circuit the value of the switching voltage applied to the comparators will be less than the value of the reference voltages applied to the comparators 61a and 61b, but more than the value of the reference voltages applied to comparators 61c through 61h.

Let it be assumed that switch 34c is closed and therefore resistor R3 is put in the switching voltage circuit. Preferably resistor R3 has a resistance value of 22000 ohms (22k). With resistor R3 in combination with resistor R10 (10K) in the switching voltage circuit the value of the voltage appearing at the switching voltage terminals of the comparators will drop from +11.50 v to +7.90 v. Since the value of the switching voltage is less than the value of the reference voltages applied to comparators 61a, 61b and 61c these comparators change their output from logic 0 (low) to logic 1 (high). Since the value of the switching voltage is more than the value of the reference voltages applied to comparators 61d through 61h, these comparators remain at logic 0 (low) output.

The outputs of the comparators 61a, 61b and 61c (logic 1, high) are fed to respective NAND gates 63a, 63b and 63c respectively. The outputs of the comparators 61b and 61c (logic 1, high) are also applied to inverters 62a and 62b respectively. The inverters invert the logic 1 (high) to logic 0 (low) and feed the inverted signal to NAND gates 63a and 63b respectively. Since NAND gate 63a is fed a logic 1 from comparator 61a and a logic 0 from inverter 62a the output of NAND gate 63a is logic 1, or "OFF". NAND gate 63b is also at logic 1 because of the logic 1 input from comparator 61b and the logic 0 input from inverter 62b. However, the NAND gate 63c is fed a logic 1 input from comparator 61c and a logic 1 input from inverter 62c and NAND L gate 63c goes to logic 0 or "ON" for the accessory controlled by output 43c. The diode 64c is for isolation purposes. The logic 1 output from the inverter 62c is from the logic 0 input received from the output of the comparator 61d.

It will be appreciated that each of the NAND gates 63a through 63g are fed inverted logic signals from inverters which receive logic signals from associated comparators. NAND gate 63h receives a constant logic 1 signal and goes from normal logic 0 to logic 1 when comparator 61h goes from logic 0 to logic 1.

Figure 3:
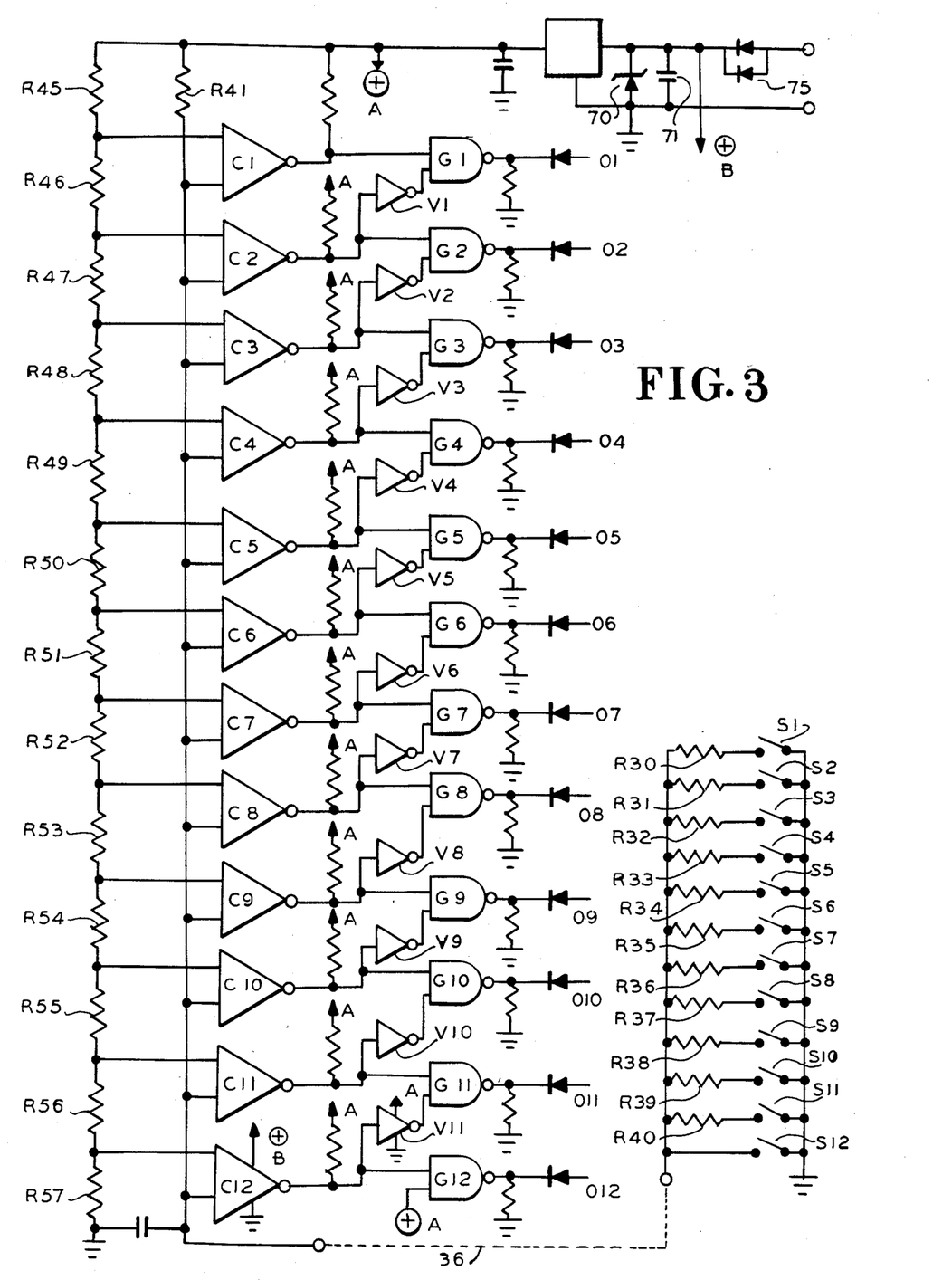
FIG. 3 is a circuit diagram of a twelve switch, single logic switch control system.

The outputs 43a, b, c and d and 45a, b, c, and d may be applied to a solid state device such as a PNP transistor which may serve as a solid state switch and be turned "ON" when a logic 0 (low) appears at the output terminal. This is represented in FIG. 3, discussed more fully below.

An example of reference voltage values and switching voltage values that may be used when practicing the invention are as follows:

| Control Comparator | Reference Voltage | Switching Voltage |
| --- | --- | --- |
| 61a | +10.51 | +10.00 |
| 61b | +9.52 | +8.95 |
| 61c | +8.53 | +7.90 |
| 61d | +7.54 | +6.95 |
| 61e | +6.55 | +5.98 |
| 61f | +5.56 | +5.00 |
| 61g | +4.57 | +4.05 |
| 61h | +3.58 | +3.10 |

It should be understood that the value of the reference voltages and the value of the switching voltages used will depend on the operating values and tolerances of the electrical components used.

FIG. 3 is a circuit drawing of a single line multiple switch multi-control system used successfully, in practicing the invention.

A bank of switches S1 through S12 were located on a steering wheel hub of a vehicle. These switches were connected on the moving side of the switch to ground. Associated with each respective switch is a respective resistance, R30 through R40, the individual values of which were selected so as to create the desired switching voltage for application to the comparators C1 through C11, when one of the switches was closed placing its associated resistor in the switching voltage circuit line along with resistor R41. It will be noted that switch S12 has no associated resistor so that when switch S12 is closed the voltage value in the switching voltage line is pulled to ground.

The resistors R45 through R57 form the reference voltage points along the reference voltage line and the comparators C1 through C12 compare the voltage levels similar to that described with respect to FIG. 2. NAND gates G1 through G12 respond to the logic signal outputs of the comparator with which the gate is associated and, in the case of gates G1 through G11, to the outputs of the inverters V1 through V11. NAND gate G12 receives a signal from the high input +A. The outputs 01 through 012 are individually turned "ON" or "OFF" in the same manner as that described with reference to FIG. 2.

The block VR represents a voltage regulator which is protected by the zener diode 70 and capacitor 71. The diodes pair 75 ensure the supply is of direct current characteristic.

Figure 4:
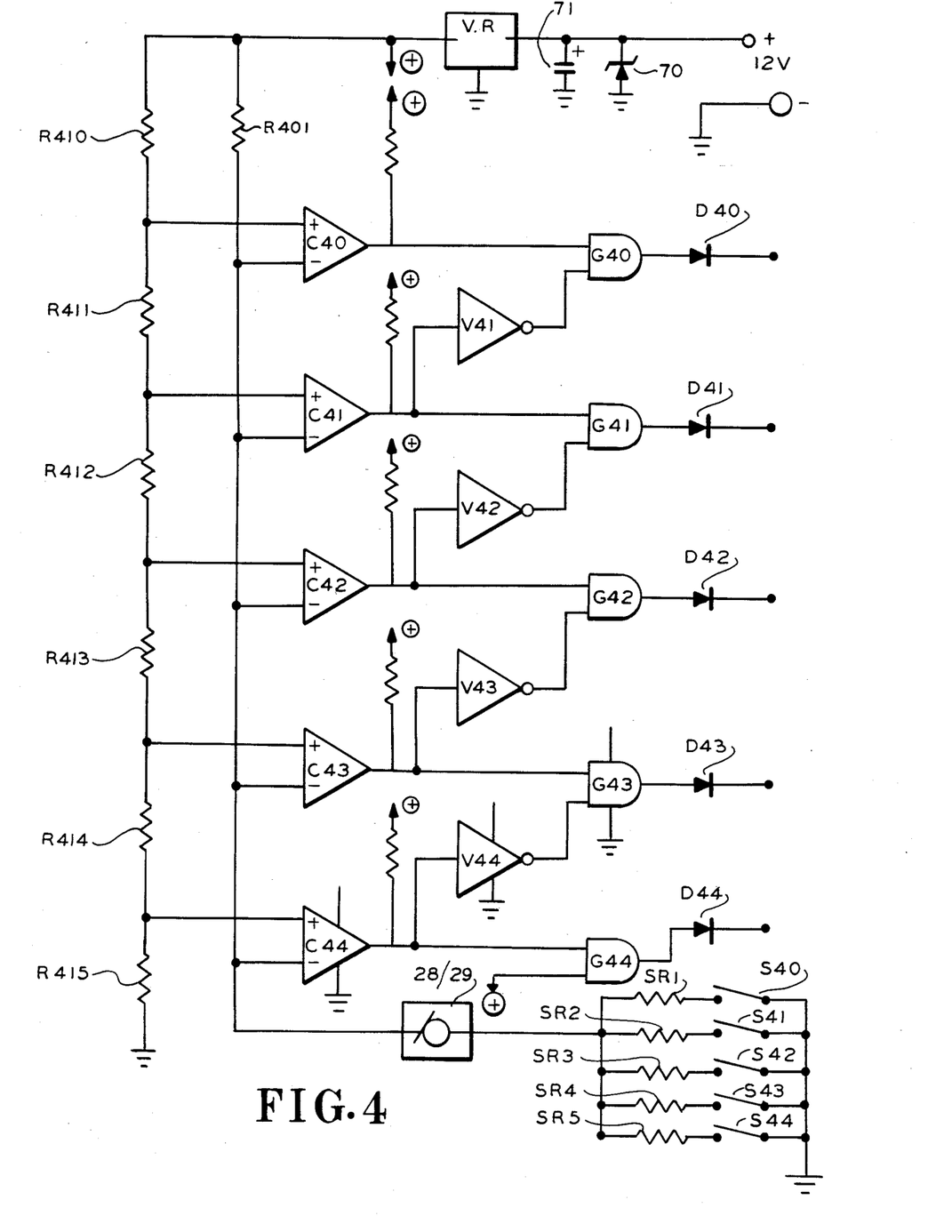
FIG. 4 is a circuit diagram of a five switch single line logic switch control system using some alternate circuit components.

Referring now to FIG. 4, a circuit diagram of an alternate structure circuit is represented in five switch single line circuit control system in which the voltage level of the switch controlled voltage is controlled by the resistor R401 and the switch resistors SR1 through SR5 upon closure of the switches S40 through S44.

The control comparator components C40 through C44 correspond to the control comparator components 61a through 61h of FIG. 2, for example. The inverter elements V41 through V44 correspond to the inverter components 62a through 62g of FIG. 2, while the AND gates G40 through G44 provide an output distinguishable from the output of the NAND gates 63a through 63h of FIG. 2, for a corresponding input. The diodes D40 through D44 pass signals of logic 1 (high). The resistors R410 through R415 establish the threshold levels for the comparators C40 through C44.

Figure 5:
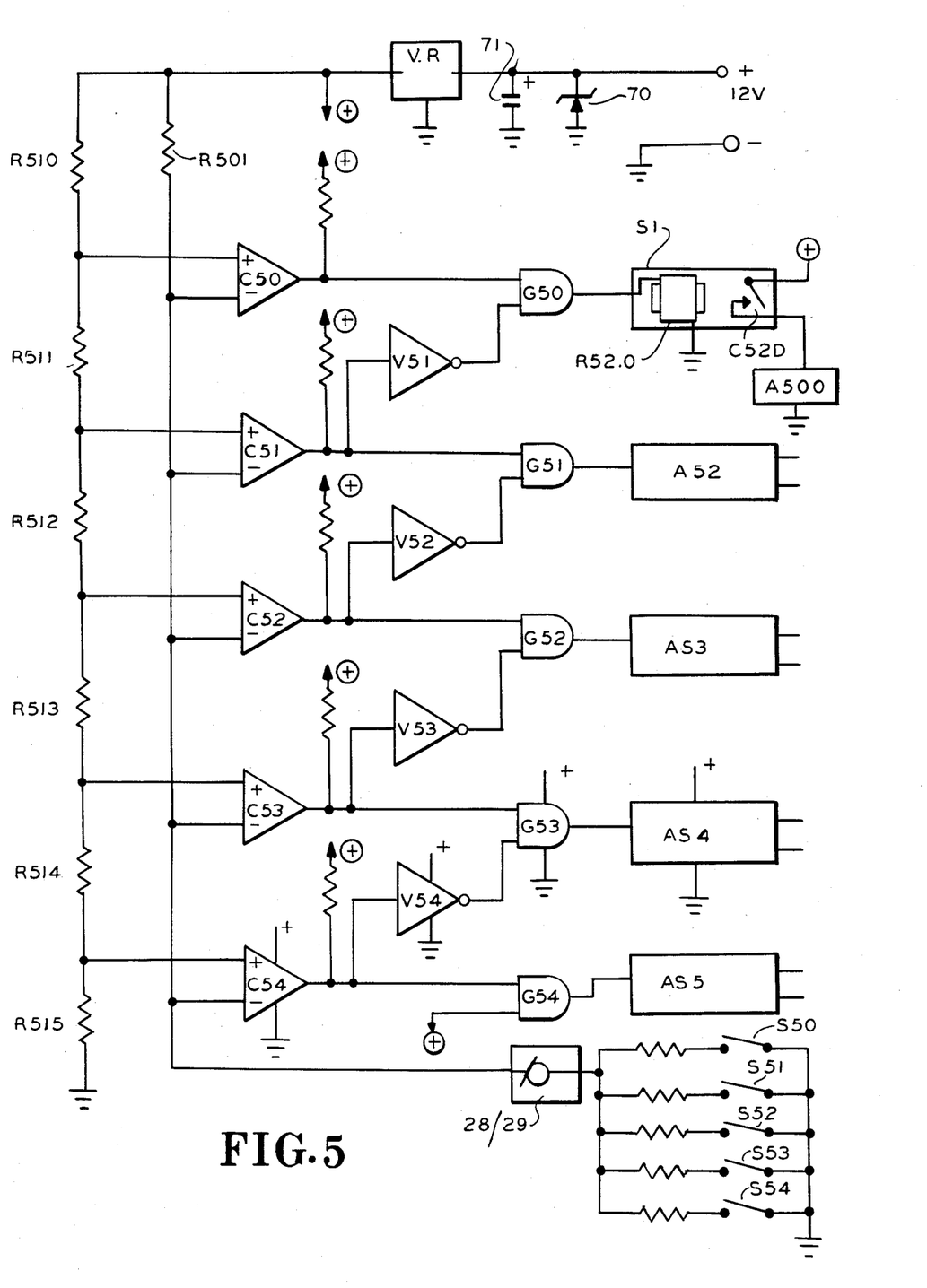
FIG. 5 is a circuit diagram of a five switch single line logic switch control system for selectively actuating analog switches; and, FIGS. 6 and 7 are circuit diagram of five switch single line logic switch control systems for selectively actuating semi-conductor switches.

FIG. 5, represents another alternate circuit structure of single level switch circuit control system similar in some respects 15 to that represented by FIG. 4 except the outputs of the AND gates G50 through G54 in FIG. 5 are applied directly to the core of a relay R520. The normally open contacts C520 would be closed when the relay is energized such as by a logic 1 (high) signal applied through AND gate G50. The contact C520 when closed may complete a circuit from the regulated supply to some accessory represented by block A500, such as a radio, windshield wipers or other accessory, for example. The analog switches A52 through A55 may correspond to the more detailed representation of analog switch A51 and each may control a different piece of accessory equipment in the vehicle.

Figure 6:
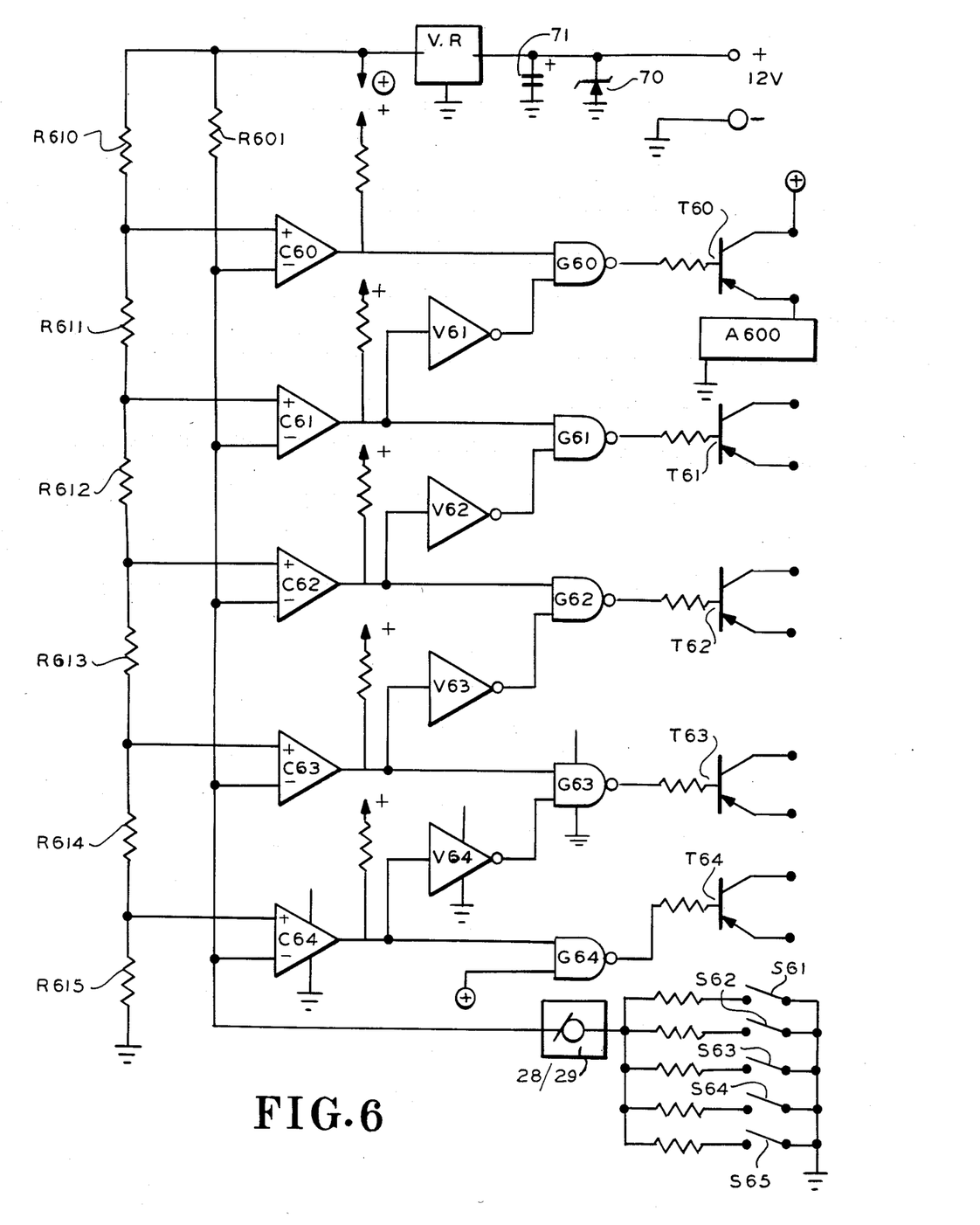

FIG. 6, represent another multi-switch single line circuit control system similar in some respects to the multi-switch single line circuit control system represented in FIGS. 2 or 3 except that the output of the NAND gates G60 through G64 in FIG. 6 are each applied to the base terminal of a PNP transistor T60 through T64, respectively. The PNP resistors T60 through T64 may serve as semiconductor switches and when a logic 0 (low) signal is applied to the base of the transistor T60 via the base resistor the low signal will permit the transistor to pass current from the positive supply to an accessory A600. The block A600 may represent a radio or windshield wiper or other vehicle accessory for example.

Figure 7:
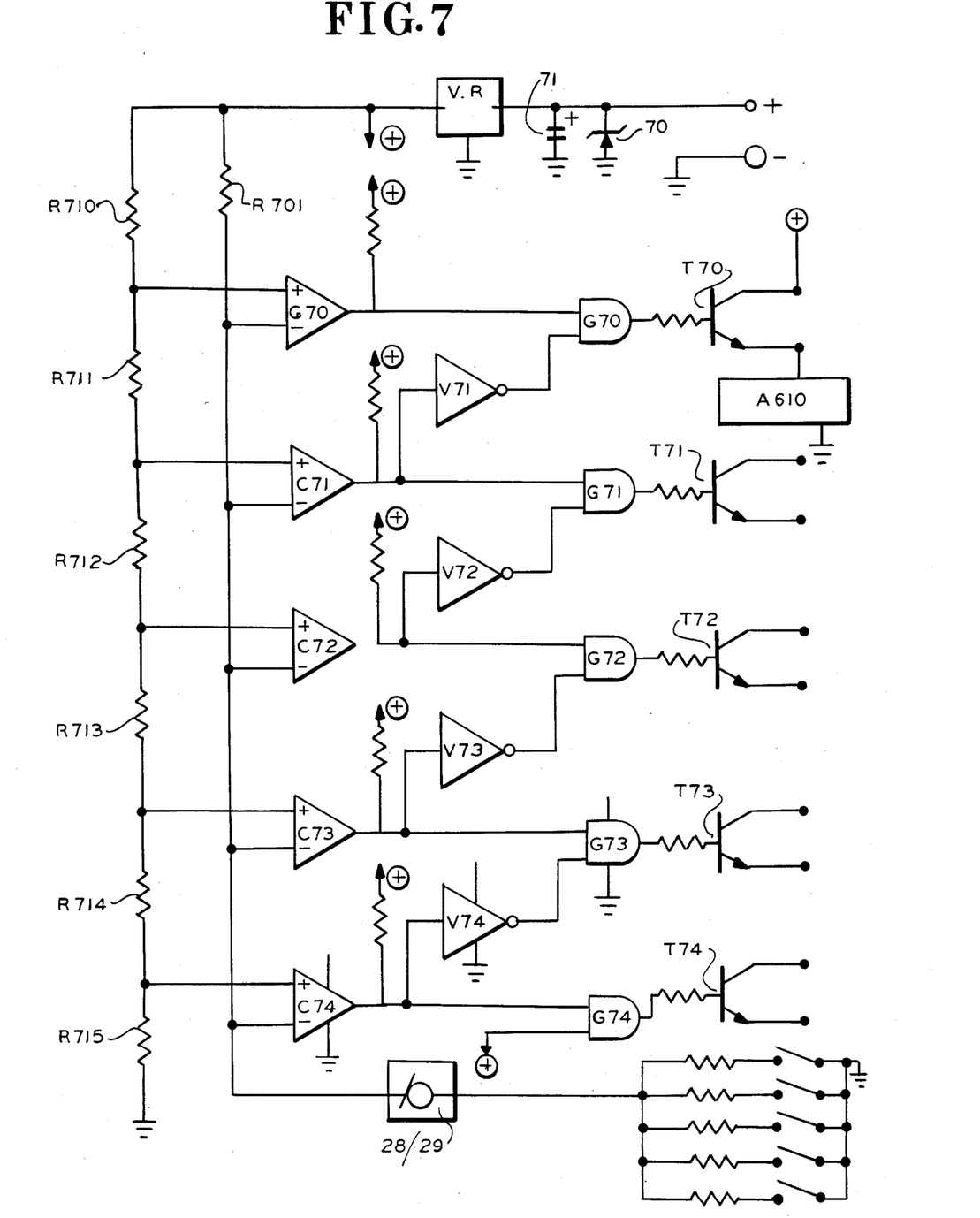

FIG. 7 represents another multi-switch single line circuit control system similar in some respects to FIG. 4 except that the outputs of the AND gates G70 through G74 are applied to solid state transistor switches T70 through T71, which are represented as NPN transistors. In this circuit a logic 0 or low signal applied from 15 AND gate G70 to the base terminal of transistor switch T70 would turn the transistor "off" while a logic 1 or high signal applied through the base resistor to the base terminal of transistor T70 would function to turn the transistor "on" and thus pass current to the accessory A610, which may be a radio, for example.

The blocks 28/29 in the various figures represent the connection represented in more detail in FIG. 1a or may represent a single lead line loosely set about the steering shaft of the steering wheel.

Thus there has been shown and described a multi-switch single line multi-control circuit system using different switching elements and different circuit elements, all using the same basic principals and inventive concept. Although several various forms of the invention are represented these are not exhaustive of the forms the invention may take and other changes and modifications may be made, as will become apparent to those skilled in the art after disclosure is made, without departing from the concept and principals of the invention.

What is claimed is:

1. A control system for controlling accessory equipment in a motor vehicle wherein control switches are located in the hub of a steering wheel of said motor vehicle remote from a control circuit network, said control system including:

(a) a source of power and a return;
(b) a first voltage divider including at least a first resistance and a common junction between said source of power and said return;
(c) a second voltage divider including at least a plurality of resistors in series connection between said source of power and said return;

(d) a plurality of substantially identical parallel circuits connected sequentially between said source of power and said return, each circuit of said plurality of circuits including a first input, a second input, a comparator, a logic gate, a switch and a load;

(e) said first input of each said circuit connected to said common junction for applying a first voltage to said comparator of each said circuit;

(f) said second input of each said circuit connected to said second voltage divider for applying a second voltage to said comparator of each circuit such that the value of said second voltage applied to the respective comparator is different from the value of that voltage applied to adjacent comparators as a function of the sequential position of the circuit along said second voltage divider;

(g) each said circuit of said plurality of circuits, except the first circuit of said plurality of circuits positioned along said second voltage divider further including one inverter, said inverter connected between the output of said comparator and one of the inputs of said logic gate of the parallel circuit in the higher adjacent position along said second voltage divider;

(h) a plurality of resistance elements equal in number to the number of circuits in said plurality of circuits and connected in parallel connection to each other and each resistance element of said plurality of resistance elements connected in series connection between said common junction and said return for changing the value of said first voltage when one or the other of said resistance elements is electrically inserted between said common junction and said return;

(i) said switch of each said circuit having a normally open condition and a closed condition, driven to a closed condition in response to an output from a logic gate of the circuit of which each component is a part, said switch for electrically closing an electric circuit to at least one acessory of said accessory equipment of said motor vehicle when said switch is in said closed condition; and, (j) a plurality of switch means equal in number to the number of resistance elements in said plurality of resistance elements and connected in parallel with each other and each switch of said plurality of switch means connected in series with at least one of said resistance elements of said plurality of resistance elements and each said switch of said plurality of switch means connected to said return for electrically inserting a different resistance element each into said first voltage divider for driving one circuit of said plurality of substantially identical, parallel circuits for controlling at least one accessory of said accessory equipment.

2. A control system as in claim 1 and in which said logic gate is an AND gate and said switch is a set of relay contacts, said relay contacts being driven to a closed condition by energization of a relay coil.

3. A control system as in claim 1 and in which said logic gate is an AND gate and said switch is a transistor, the output of said AND gate being applied to the base junction of said transistor for driving said transistor into a conductive state.

4. A control system as in claim 1 and in which said logic gate is a NAND gate and said switch is a semiconductor switching element normally in an open circuit condition and driven to a closed circuit condition in response to an output from said NAND gate.

* * * * *